United States Patent
Cipolla

[19]

[11] Patent Number: 6,012,711
[45] Date of Patent: Jan. 11, 2000

[54] ALIGNMENT DEVICE FOR ESTABLISHING A COPLANAR RELATIONSHIP BETWEEN FIRST AND SECOND SURFACES

[75] Inventor: Thomas Mario Cipolla, Katonah, N.Y.

[73] Assignee: International Business Machines Corporation, Armonk, N.Y.

[21] Appl. No.: 08/988,324

[22] Filed: Dec. 10, 1997

[51] Int. Cl.[7] .................................................. B25B 11/00
[52] U.S. Cl. ............................ 269/21; 269/20; 269/75; 269/258; 269/285
[58] Field of Search .................................. 269/21, 75, 20, 269/266, 258, 264, 285; 248/181; 294/64.1, 65; 414/676, 941

[56] References Cited

U.S. PATENT DOCUMENTS

| | | | |
|---|---|---|---|
| 3,694,894 | 10/1972 | Jelinek et al. | 269/21 |
| 4,491,306 | 1/1985 | Eickhorst | 269/21 |
| 4,875,614 | 10/1989 | Cipolla et al. | |
| 4,934,671 | 6/1990 | Laninga et al. | 269/20 |
| 5,139,245 | 8/1992 | Bruns et al. | 269/21 |
| 5,395,098 | 3/1995 | Eickhorst et al. | 269/21 |
| 5,452,905 | 9/1995 | Bohmer et al. | 269/21 |

*Primary Examiner*—Robert C. Watson
*Attorney, Agent, or Firm*—Pollock, Vande Sande & Amernick

[57] ABSTRACT

An alignment device for establishing alignment between the surfaces of abutting components. A rotary table supports a base plate for rotation in a plane. An air bearing connected to the base plate in turn supports a support plate. The air bearing includes an upper spherical protrusion supported in a spherical cavity coupled to an air passageway in the base plate. Compressed air enters the air passageway and establishes an air interface between the upper and lower bearing components. The support plate is stabilized with respect to the base plate by a series of spring adjustments. The component support of the base plate is free to change planarity in response to an abutting surface of another component.

15 Claims, 4 Drawing Sheets

ALIGNMENT DEVICE FOR ESTABLISHING A COPLANAR RELATIONSHIP BETWEEN FIRST AND SECOND SURFACES

BACKGROUND OF THE INVENTION

The present invention relates to an apparatus for aligning the surface of a small component to be coplanar with a second component surface. Specifically, an air-bearing support which is capable of positioning a surface of a small circuit component parallel to a surface of an abutting component is described.

The present invention is directed to a common problem in microelectronic packaging technology. When fabricating electronic circuits by bonding small components together, there is a need to position the components to be coplanar with less than a 1 micron difference between surfaces of the components. The process of forming thermocompression bonds between leads of a component and corresponding circuit connections is one example of an application which requires an extreme degree of planarity between the silicon chip and the circuit leads. In the flip chip technology, microelectronic chips are placed face down on a silicon substrate and pressure is applied to the silicon chip in a uniform way, and the flip chip and silicon substrate are brought into coplanarity as a result of the applied pressure. If the planarity is not maintained the strength of the bond formed between leads of the chip and circuit component is directly affected.

An additional example of the need for positioning one component coplanar to another can be found in the liquid crystal art. A top glass is applied to a silicon or polysilicon substrate. The top glass and substrate are brought together under uniform pressure to reduce the gap between them to a few microns. If the surfaces are not maintained in a parallel condition, a difference of only 1 micron will produce an objectionable nonuniform performance of the liquid crystal element.

The problem of positioning components in a coplanar relationship has been addressed in U.S. Pat. No. 4,875,614. The alignment device described in this reference provides a surface for supporting a component which is capable of rotating in first and second perpendicular axes about a point that lies on the surface of the contact. The device provides a first carriage having a cylindrically concave surface which receives a second carriage having a complementary cylindrical convex surface. The two carriages are connected by roller bearing means which extend along first and second perpendicular directions between the two carriages. The second carriage supports a first component having a surface facing the surface of a second component. As the second component is brought into contact with the surface of the first component, the second carriage rotates in response to the force applied by the first component, thereby tilting the first component about two mutually perpendicular axes and establishing coplanarity between the first and second components.

The foregoing device has limitations with respect to positioning very small components. As component sizes decrease to a few millimeters on each side, an insufficient amount of torque may be generated to move the first carriage with respect to the second carriage due to friction between the roller bearings and the carriage surfaces.

Additionally, using the device of the foregoing patent with very small components results in the rotation of the first component as it is made coplanar with the contacting surface. While a coplanar relationship may be established, the resulting rotational misalignment between the two surfaces about an axis perpendicular to the two surfaces must be corrected with still other means associated with a component support.

The present invention provides for a solution to the foregoing problems which results from packaging very small components.

SUMMARY OF THE INVENTION

It is an object of this invention to establish the coplanarity between surfaces of very small circuit components.

It is a specific object of this invention to establish coplanarity between small electronic components while avoiding rotational misalignment about an axis perpendicular to the mating surfaces of the components.

It is an additional object of this invention to manually adjust the initial rotational position of a component surface which is to be placed in a coplanar relationship with a second component surface.

These and other objects of the invention are provided by the alignment device which has a component support surface connected to a spherical air bearing. The support surface is capable of tilting along a solid angle of a vertical axis through the support table to establish coplanarity between a component surface which abuts a second component surface. The air bearing reduces the frictional force between elements of the alignment device rendering the force necessary to establish coplanarity at an absolute minimum.

In accordance with a preferred embodiment of the invention, the air bearing includes a spherical protrusion which is supported on an air surface within a complementary concave surface of a lower bearing member. The upper bearing member is connected to the component support surface permitting the component support surface to tilt with respect to a horizontal plane. The support surface is spring biased with respect to the lower bearing member to provide an opposing force to the supporting air pressure and to provide a reaction torque to any perturbation which tends to disturb the rotational alignment about an axis perpendicular to the two component surfaces so that the original rotational state can be maintained.

In accordance with the preferred embodiment, the air bearing may be supported on a rotating table, to permit positioning of the plane of the support component. A vacuum holding port may be provided on the surface of the support surface for holding the component in place during positioning.

DESCRIPTION OF THE PREFERRED EMBODIMENT

Figure 1:
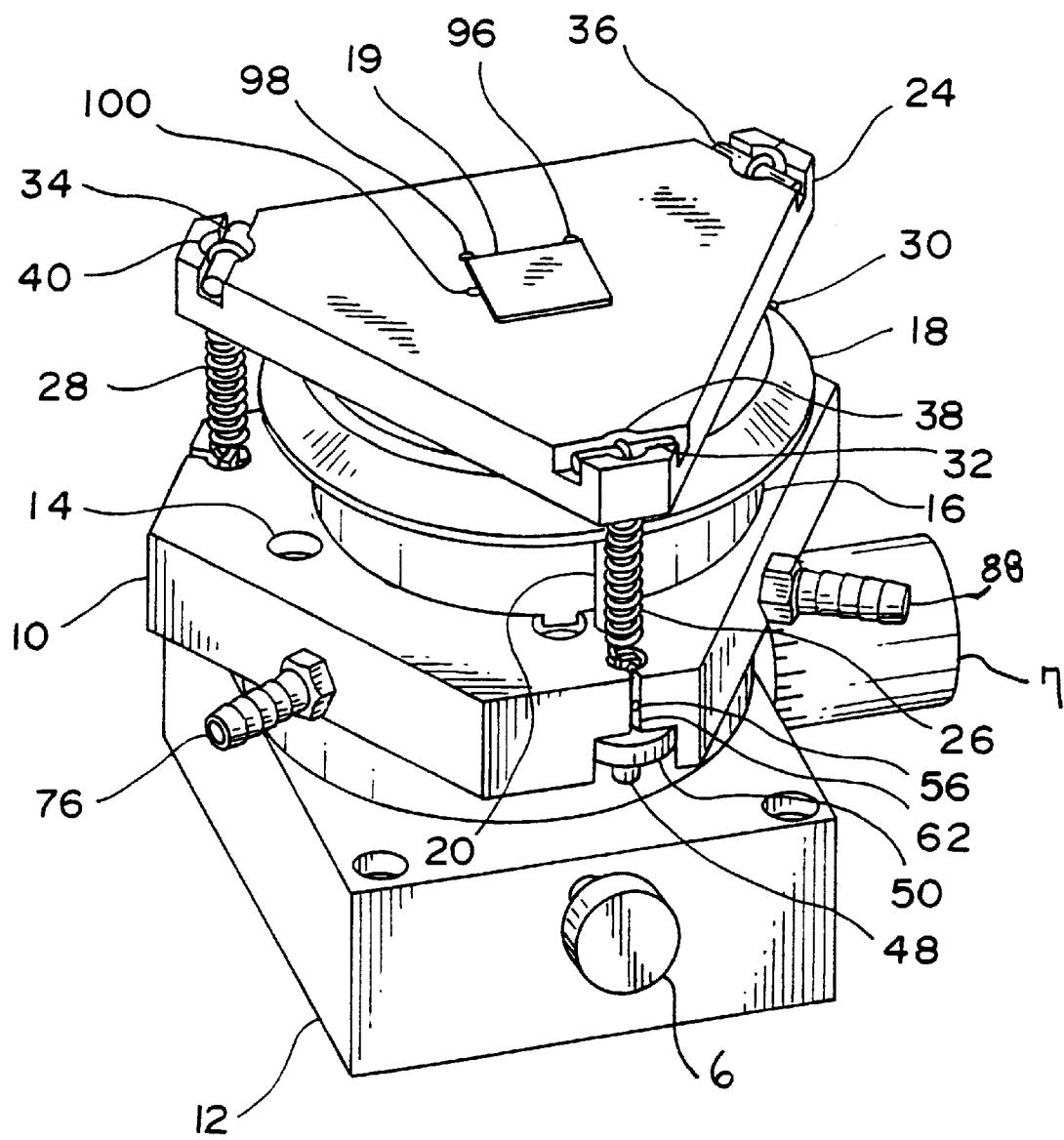
FIG. 1 is an isometric view of a preferred embodiment of the invention for supporting a microcircuit chip 19.
Figure 2:
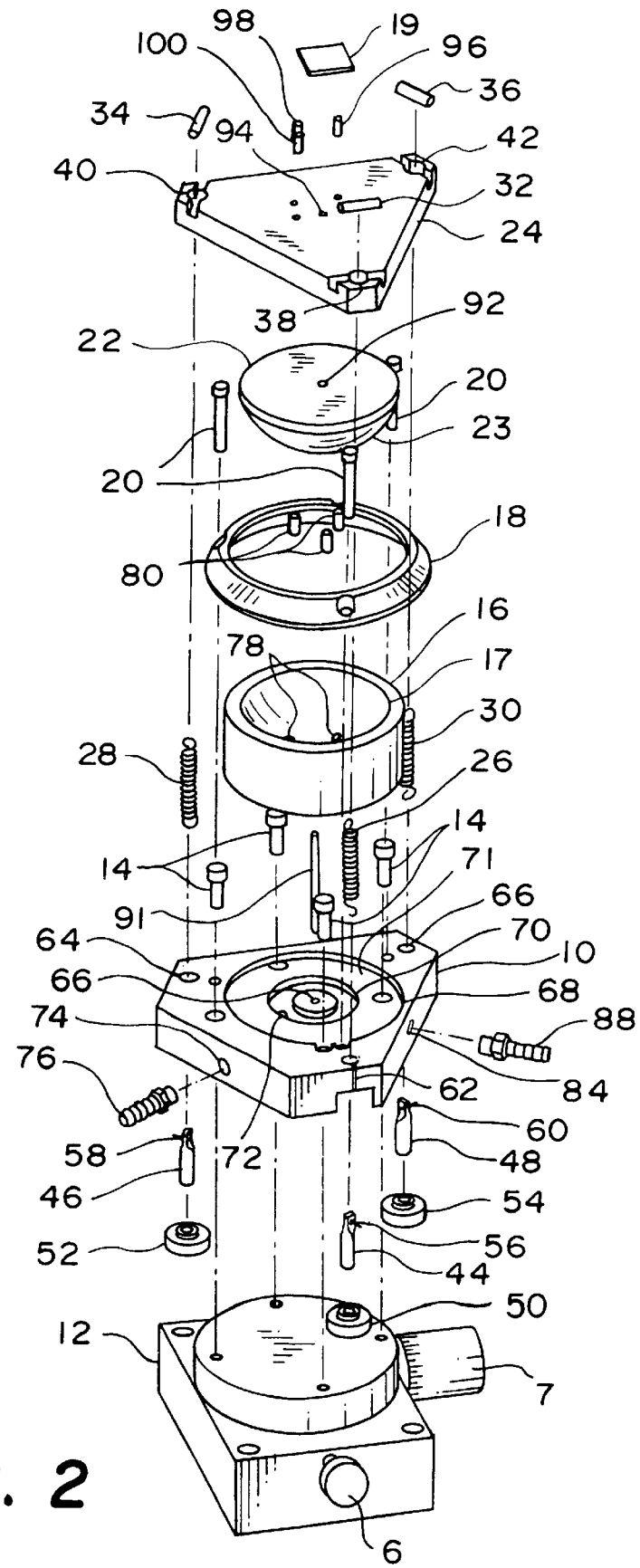
FIG. 2 is an exploded view of the apparatus shown in FIG. 1.
Figure 3:
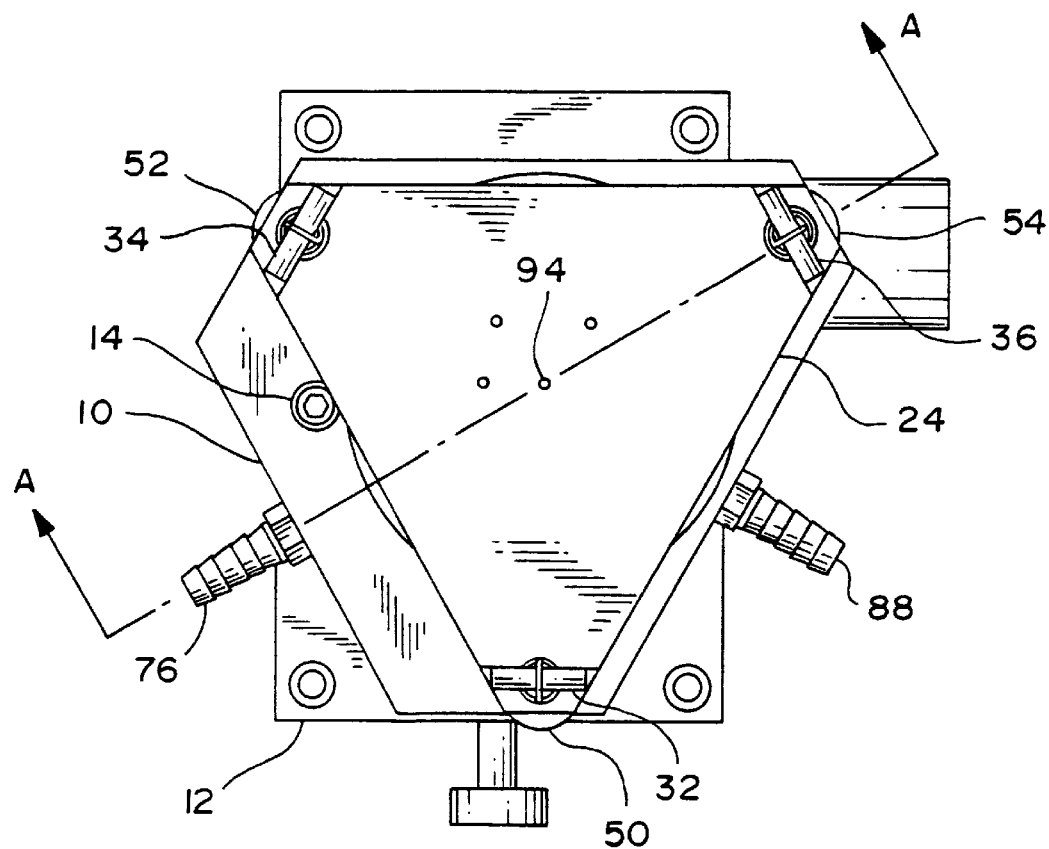
FIG. 3 is a top view of the apparatus of FIG. 1.

Referring now to FIGS. 1 and 3 there is shown an isometric view and a top view, respectively, of an alignment device in accordance with the preferred embodiment of the invention. The alignment device includes a support surface 24 which maintains one side of a component 19 flush against the support surface. The component 19, as will be evident from the other figures of this embodiment, is supported in position by alignment pins 96, 98 and 100 which establish a nominal initial location for component 19. The support plate 24 is positioned on an air bearing comprising an upper air bearing component 22 (visible in FIGS. 2 and 4), and a lower air bearing component 16. The air bearing assembly is in turn supported on a base plate 10 which in turn is supported on a rotating table 12. The base plate 10 includes a first inlet 76 for supplying compressed air to the air bearing assembly. A second inlet 88 provides a vacuum to the vacuum port underneath component 19. Thus, component 19 is maintained flush with and kept from moving with respect to the surface of the support plate 24 as a result of the vacuum pressure on the under side of component 19.

The rotating table 12 which is a conventional prior art positioning device, rotates the base plate 10 about an axis parallel to the central axis of the air bearing to initially locate the surface of component 19 in alignment with a second component, which abuts against the upper surface of component 19.

A plurality of bias springs 28, 26 and 30 supply a bias force at the periphery of the support plate 24, stabilizing the support plate 24 against perturbation forces which may be applied to the support plate 24 once the component 19 is located to be coplanar with an abutting component surface.

The initial plane of tilt of component 19 is adjustable by a rotating knurled control member 50 which maintains a springpost 48 within a hole and corresponding slot 62 in the base plate 10.

In operation, the device of FIG. 1 brings a surface of component 19 in a planar relationship with an abutting component (not shown), when the abutting component applies a force between abutting surfaces of the components. Guide pins 96, 98 and 100 establish a nominal initial location for component 19 with respect to support plate 24. The position of support plate 24 will then move as a result of the air bearing support, permitting surfaces of the components to establish coplanarity as in the prior device of the aforesaid U.S. Patent. However, the air bearing support provides considerably less resistance to the rotation of support plate 24, thus permitting even smaller components to be positioned with a minimal amount of applied force between components. The rotational position about an axis perpendicular to the top surface of component 19 is accomplished through the Vernier control 7 of rotating table 12, or similar rotational positioning device known in the art and locked in place with the manual lock 6. Thus, the prepositioning of the rotational position of component 19 is realized prior to establishing a coplanar relationship between component 19 and an abutting component surface.

Figure 4:
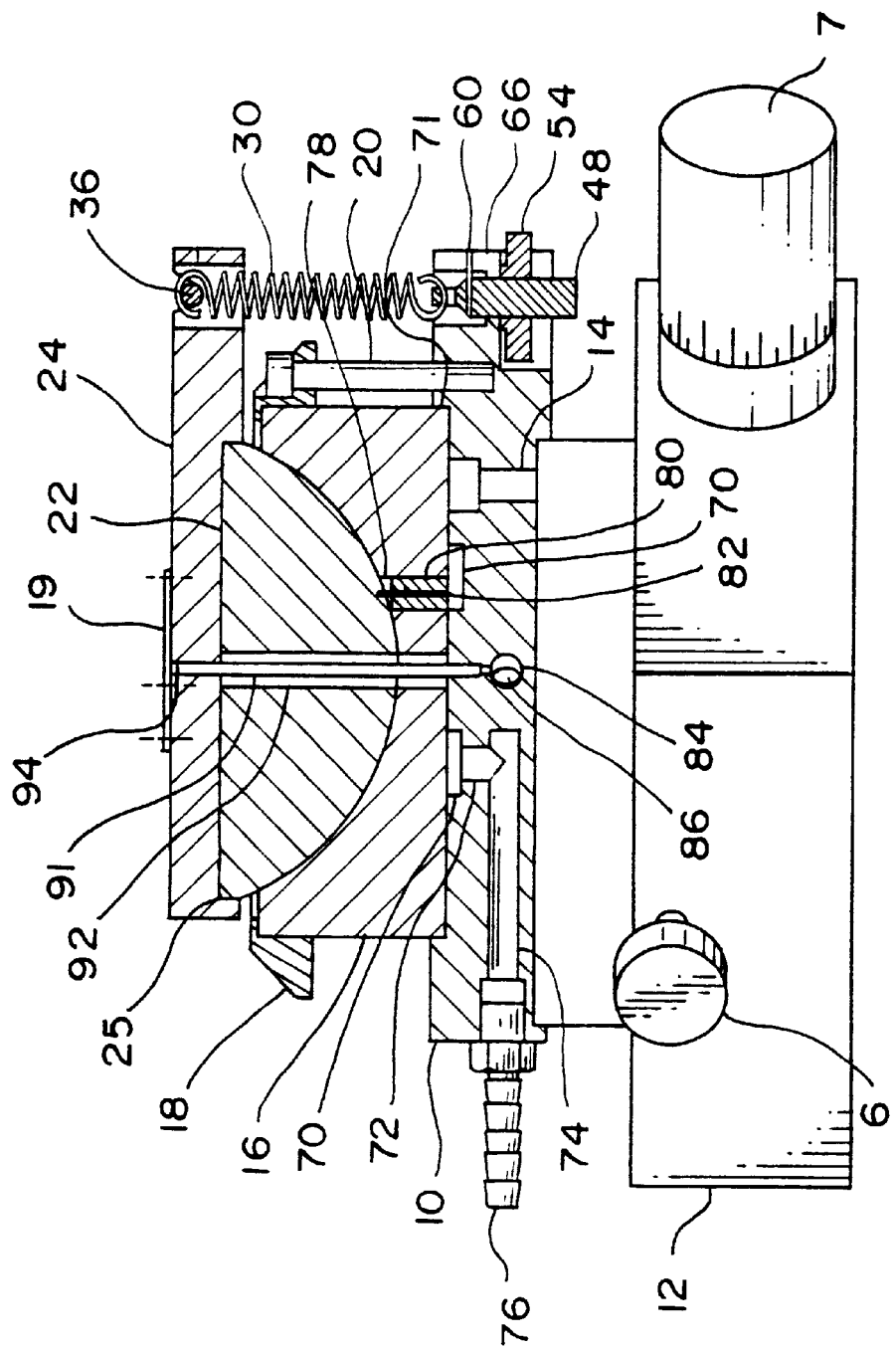
FIG. 4 is a section side view of the alignment device taken through A—A of FIG. 3.

A section view A—A of the top view of FIG. 3 is shown in FIG. 4. The upper air bearing element 22 includes a spherical surface which is complementary to a concave spherical surface of the lower air bearing element 16. The upper air bearing element 22, and lower air bearing element 16 in one embodiment of the invention, are configured from glass. Using conventional glass/lens fabrication techniques, an accurate spherical glass surface may be created for the upper bearing element 22, as well as a complementary concave spherical surface formed in glass constituting the lower air bearing element 16. The upper air bearing element 22 has a top surface which is received in a recess 25 of the support plate 24 as is shown in FIG. 4, and the lower air bearing element 16 is received in a recess 71 of the base plate 10. An air interface of approximately 12 microns separates each of the air bearing elements 22, 16 to provide a frictionless coupling between the two elements. Three orifice members 80 feed compressed air from an annular recess 70 in the base plate 10 to the concave surface of lower air bearing element 16. Compressed air is supplied through the air inlet 76 and is forced through annular recess 70 and the orifice members 80 located in clearance holes 78, in the glass lower air bearing element 16 and form the air surface between upper and lower bearing elements 12, 16.

Also shown in the section view of FIG. 4 is the presence of a vacuum port 94 formed in the support plate 24 on the under side of component 19. The vacuum port 94 is connected through a conduit 91 passing through a clearance hole 92 in the upper spherical bearing element 22, and thence through a clearance hole in the lower bearing element 16. A passageway 84 may be formed within the base plate 10 which connects to a hose fitting 88 which in turn is connected to a source of vacuum pressure.

Locating the conduit 91 along the axis of the spherical protrusion of air bearing element 22, and lower bearing member 16 permits relative motion between the spherical protrusion and conduit 91. As the degree of change necessary in support plate 24 to establish coplanarity is quite small, typically under 10, the clearance hole 92 permits tilting of the spherical protrusion of upper bearing element 16 without interference with conduit 91.

The support plate 24 has a recess 25 which receives the top of upper bearing element 22 is stabilized with three extension springs 26, 28 and 30. The extension springs are connected at one end by pins 32, 34 and 36 to the support plate 24 and at a second end to the base plate 10 through a series of spring posts 44, 46 and 48. The spring posts 44, 46, 48 are threaded at one end, and extend through apertures 62, 64 and 66 of the base plate 10. Knurled fasteners 50, 52 and 54 threaded to the spring posts retains the spring posts within the holes 62, 64 and 66. The holes include a slot, which receives a post 56, 60 and 58 extending perpendicularly from the spring posts 44, 46 and 48 which maintains the spring posts from rotating. Thus, the tension on the support plate 24 at each of three corners of the support plate may be adjusted by rotating a respective knurled knob 54, 52 and 50.

The bias force applied to the support plate 24 maintains a downward pressure on the upper bearing element, as a counterforce to the compressed air between upper and lower bearing elements 16 and 22 leaving an air surface between bearing elements 16 and 22. In the event a disturbing force is experienced by the support plate 24, once a coplanar positioning of the component is effected springs 26, 28 and 30 tend to restore position of the support plate 24 and component 19.

The exploded view of FIG. 2 illustrates a detail of base plate 10 which permits compressed air to be forced from the compressed air inlet 76 through passageway 74 through a recess 70. The recess 70 is disposed below the orifices 80 located in through hole 78 of the lower bearing element 16. The lower bearing element 16 is in turn held in place by retaining ring 18 and three screws 20 which engage threads contained within corresponding holes of base plate 10. The base plate is in turn fastened with fasteners 14 through threaded holes in the rotary table 12.

A hole 86 is shown which is stepped to receive a conduit 91. Conduit 91 carries the vacuum through the clearance holes of the upper and lower spherical bearing elements 22 and 16. The end of conduit 91 resides on a stepped portion of the hole 86. Hole 86 is in communication as shown in FIG. 3 with a passageway 84 connected to hose fitting 88.

Thus, the foregoing preferred embodiment is capable of providing both an air bearing surface for permitting a relatively friction free movement of a support plate 24 bearing a component 19 above a spherical axis. Component 19 is advantageously located at the radius curvature for a spherical portion of upper bearing element 22. Component 19 is held in position against alignment pins 96, 98 and 100, and preferably against the surface of support plate 10 by the vacuum port 94. The rotational position of the component 19 can be initially set with the Vernier control 7 and locked in place with the manual lock 6. The planarity of component 19 in response to a component which is forced against the surface of component 19 is then established by tilting of an upper bearing element 22.

Thus, there has been described with respect to one embodiment a description of the invention which illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. An alignment device comprising:

a base plate;

an air bearing supported on said base plate, said air bearing including:

a lower bearing member having a spherical recess, said spherical recess including an air channel communicating with an aperture of said base plate which is coupled to a source of compressed air;

an upper air bearing member having a spherical protrusion which is received in said spherical recess and maintained against an air bearing of said compressed air by an adjustable biasing means to vary a force applied in opposition to a force produced by said compressed air; and a component support on said upper air bearing member for supporting a component surface which is to be coplanar with a surface of a second abutting component.

2. The alignment device according to claim 1 further comprising:

a rotary table supporting said base plate.

3. The alignment device according to claim 1 wherein said component support includes means for holding said component on said component support.

4. The alignment device according to claim 3 wherein said component support comprises a vacuum port.

5. The alignment device according to claim 4 wherein said vacuum port is connected to a source of vacuum through a conduit which extends through an axis of said spherical protrusion and said spherical cavity to a source of vacuum pressure in a channel of said base plate.

6. An alignment device comprising:

a rotary table supporting a base plate;

an air bearing connected to said base plate, said air bearing including an upper spherical protrusion supported in a spherical cavity, said spherical cavity including an air passageway coupled to an air passageway of said base plate;

a support plate supported by said upper spherical protrusion, said support plate including a plurality of bias adjustments for applying a biasing force distributed around the periphery of said support plate against a force exerted by compressed air on said spherical protrusion; and component holding means on said support plate for holding a component having a surface to be coplanar with the surface of another component.

7. The alignment device according to claim 6 wherein said component holding means supports a component along an axis of said spherical protrusion.

8. The alignment device according to claim 6 wherein said component holding means is a vacuum port in a surface of said support plate.

9. The alignment device according to claim 6 wherein said component holding means comprises:

a conduit centrally located along an axis of said spherical protrusion and said spherical cavity and terminating in a passage way in said base plate, said passage way being connected to a source of vacuum pressure.

10. The alignment device according to claim 6 wherein said bias adjustments comprise:

first, second, and third springs connected at one end along the periphery of said support plate, and connected at remaining ends to a respective threaded spring post attached to said base plate.

11. The alignment device according to claim 10 wherein said spring post is held in a through hole in said base plate by a threaded member which adjusts the length of a connected spring.

12. The alignment device according to claim 8 further comprising alignment pins adjacent said vacuum port for positioning a component with respect to said vacuum port.

13. The alignment device according to claim 6 wherein said spherical cavity air passageway includes an orifice coupled to said air passageway in said base plate.

14. The alignment device according to claim 6 wherein said spherical protrusion is made of glass.

15. The alignment device according to claim 6 wherein said spherical cavity is made of glass.

* * * * *